(12) United States Patent
Lasser

(10) Patent No.: US 8,244,958 B2
(45) Date of Patent: Aug. 14, 2012

(54) METHOD AND SYSTEM FOR FACILITATING FAST WAKE-UP OF A FLASH MEMORY SYSTEM

(75) Inventor: Menahem Lasser, Kohav-Yair (IL)

(73) Assignee: SanDisk IL Ltd., Kfar Saba (IL)

( * ) Notice: Subject to any disclaimer, the term of this patent is extended or adjusted under 35 U.S.C. 154(b) by 0 days.

(21) Appl. No.: 11/382,056

(22) Filed: May 8, 2006

(65) Prior Publication Data
US 2006/0253645 A1 Nov. 9, 2006

Related U.S. Application Data

(60) Provisional application No. 60/678,902, filed on May 9, 2005.

(51) Int. Cl.
*G06F 12/00* (2006.01)
(52) U.S. Cl. .............. 711/103; 711/154; 714/6.1; 713/2
(58) Field of Classification Search .................. 711/103, 711/154; 714/6.1; 713/2
See application file for complete search history.

(56) References Cited

U.S. PATENT DOCUMENTS

| | | | |
|---|---|---|---|
| 5,671,388 A * | 9/1997 | Hasbun | 711/103 |
| 5,682,497 A * | 10/1997 | Robinson | 711/103 |
| 5,937,425 A | 8/1999 | Ban | |
| 6,026,465 A * | 2/2000 | Mills et al. | 711/103 |
| 6,282,605 B1 * | 8/2001 | Moore | 711/103 |
| 6,442,662 B1 * | 8/2002 | Komatsu | 711/202 |
| 6,456,528 B1 | 9/2002 | Chen | |
| 6,510,488 B2 | 1/2003 | Lasser | |
| 6,678,785 B2 | 1/2004 | Lasser | |
| 6,788,575 B2 * | 9/2004 | Kozakai et al. | 365/185.09 |
| 7,139,883 B2 * | 11/2006 | Aasheim et al. | 711/156 |
| 2003/0163594 A1 | 8/2003 | Aasheim et al. | |
| 2004/0111582 A1 * | 6/2004 | Maeda et al. | 711/202 |

FOREIGN PATENT DOCUMENTS

| | | |
|---|---|---|
| EP | 1 524 603 A1 | 4/2005 |
| JP | 2003-015929 A | 1/2003 |
| JP | 2004-234188 A | 8/2004 |

(Continued)

OTHER PUBLICATIONS

EPO, "European Search Report," corresponding European Patent Application No. EP 06 72 8339, mailed on Mar. 3, 2009, 6 pages.

(Continued)

*Primary Examiner* — Arpan P. Savla
(74) *Attorney, Agent, or Firm* — Davis Wright Tremaine LLP

(57) ABSTRACT

Methods, systems and computer-readable code for maintaining flash data structures in accordance with events of a flash memory system are disclosed. Both an events log as well as at least one flash management table are maintained in flash memory. For at least one point in time, a most recently stored flash memory table is indicative of an earlier state of the flash memory system, while at least one event that is more recent than the earlier state is stored in the events log. During power-up, the flash management table is retrieved from flash memory. If the most recent event of the flash memory table is earlier than the most recent event of the events log, events are retrieved from the events log in order to update the flash memory table. Optionally, the updated flash memory table is saved to flash memory.

41 Claims, 11 Drawing Sheets

FOREIGN PATENT DOCUMENTS

JP       2006-040168 A     2/2006

OTHER PUBLICATIONS

Figure 1:
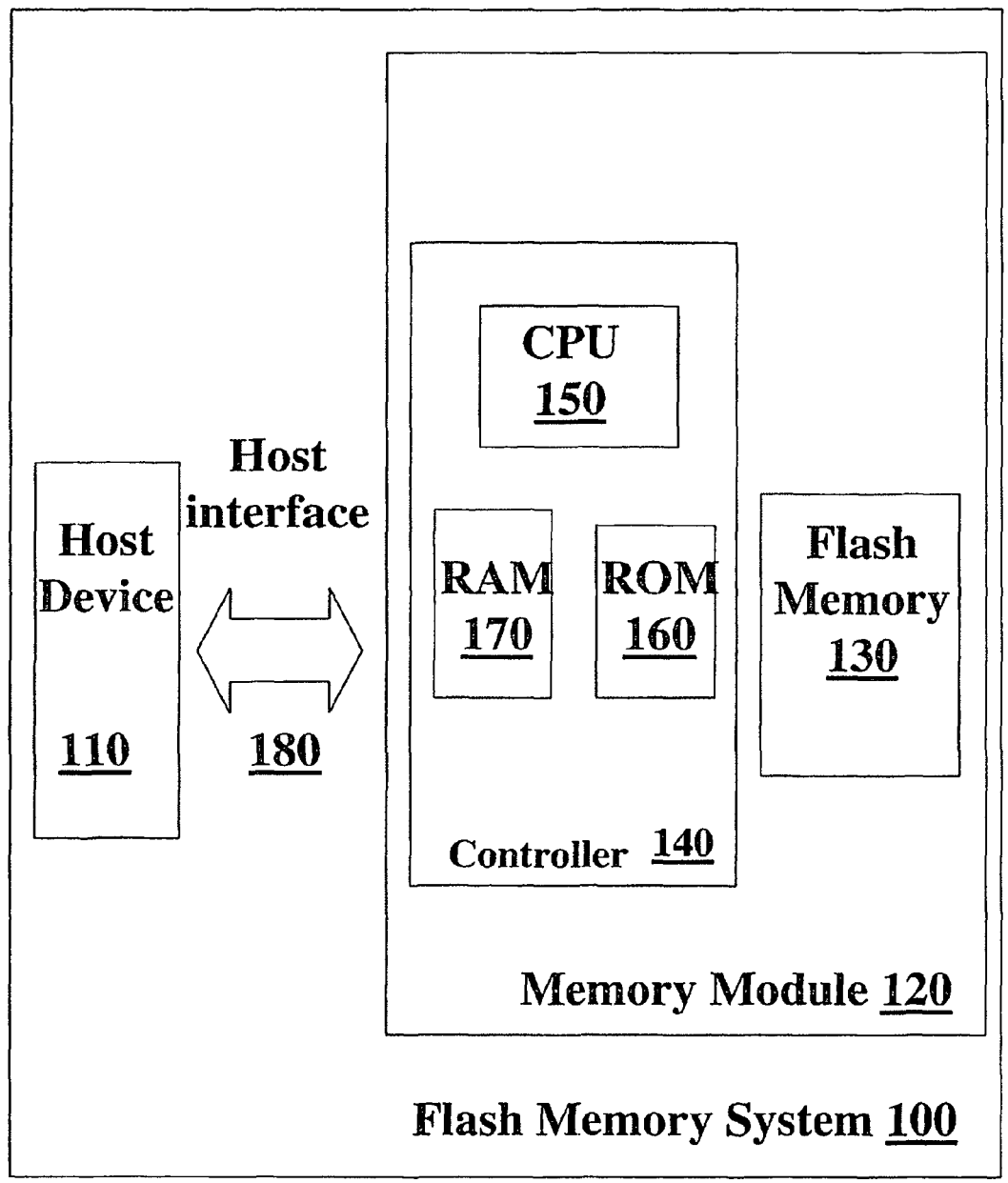

EPO, "Examiner's Substantive Report," corresponding European Patent Application No. EP 06 728 339, mailed on Jul. 7, 2009, 4 pages.

The Patent Office of the People's Republic of China, "Notification of the First Office Action," corresponding Chinese Patent Application No. 200680021190.9, mailed on Sep. 4, 2009, 8 pages (including translation.).

The Patent Office of the People's Republic of China, "Notification of the First Office Action," corresponding Chinese Patent Application No. 200680021190.9, mailed on Mar. 18, 6 pages (including translation.).

The Patent Office of Japan, "Notification of Reasons of Rejection," corresponding Japanese Patent Application No. 2008-510721, mailed on Sep. 17, 2010, 9 pages (including translation.).

The Patent Office of Japan, "Notification of Reasons of Rejection," corresponding Japanese Patent Application No. 2008-510721, mailed on Jun. 28, 2011, 6 pages (including translation.).

\* cited by examiner

For t=t₁  Translation Table 200

| Virtual Block | Physical Block |
|---|---|
| 0 | 893 |
| 1 | 485 |
| 2 | 172 |
| ⋮ | ⋮ |
| 1022 | 1 |
| 1023 | 985 |

FIG.2A

For $t=t_2$ where $t_2 > t_1$ Translation Table 200

| Virtual Block | Physical Block |
|---|---|
| 0 | 893 |
| 1 | 485 |
| 2 | 777 |
| ⋮ | ⋮ |
| 1022 | 1 |
| 1023 | 985 |

FIG.2B

METHOD AND SYSTEM FOR FACILITATING FAST WAKE-UP OF A FLASH MEMORY SYSTEM

CROSS-REFERENCE TO RELATED APPLICATIONS

This patent application claims the benefit of U.S. Provisional Patent Application No. 60/678,902, filed May 9, 2005 by the present inventor.

FIELD OF THE INVENTION

The present invention relates to methods and systems for maintaining data structures that are useful for facilitating a wake-up of a flash memory management system.

BACKGROUND

U.S. Pat. No. 6,510,488 of Lasser entitled "Method For Fast Wake-Up of a Flash Memory System" discloses a method and system for allowing a flash memory system to achieve a fast wake-up time after powering it up even if the flash system software relies on management tables whose generation from scratch is time-consuming. This fast wake-up time is achieved without sacrificing data integrity. The aforementioned patent of Lasser is incorporated by reference for all purposes as if fully set forth herein.

As explained in Lasser, using flash memory devices for computer data storage traditionally requires some software translation layer that sits between the host computer's operating system and the device low-level access routines. This is so because the flash technology has some usage limitations, which make it impossible to access it in a simple random-access linear method. One such limitation is the inability to randomly overwrite any desired memory location. Therefore, the writing of new content into a flash memory location may require first erasing the whole block containing that location (preserving the contents of any other locations still needed), and only then writing the new content.

The translation layer presents to the hosting operating system a virtual view of a random-access addressable array of independent data sectors, while hiding and handling the details of mapping those virtual addresses into their real locations in the flash media. This translation mechanism is far from trivial, and an example of such a flash memory translation layer is disclosed in Amir Ban's U.S. Pat. No. 5,937,425, which is incorporated as if fully set forth herein. Ban discloses a method for implementing a mapping mechanism between virtual and physical flash addresses. Another example of such as system is detailed in U.S. Pat. No. 6,678,785, which is also incorporated as if fully set forth herein.

The translation process relies on internal translation tables that provide the flash system software with the information required for converting the host computer data access requests to the actual flash access requests. These translation tables are constructed by the software during system wake-up (or at later time, if so requested by the hosting software), based on control information stored within the flash device. Even though it is theoretically possible not to construct such tables and instead to use only the raw control data from the flash, this is practically unusable as the response time to an access request would be too slow. This is so because accessing data on flash is much slower than accessing data in regular computer RAM memory, and also because the memory tables are usually optimized for efficiency in the type of operations required during runtime, while the flash-stored control data is not.

For example, a flash physical unit might contain the number of the virtual unit mapped to it. During program runtime we may frequently need to translate a virtual unit number into its physical counterpart. If we have to rely only on flash-stored control data, we may need to scan all units until we find one with the specified virtual unit number, a very long process by the standards of a simple media access. However, by scanning the flash device once on system wake-up and constructing a table mapping each virtual unit number into a corresponding physical unit number, we are able to later do such mappings very efficiently.

The problem is that scanning the flash data storage device on system wake-up might take a long time, especially for high capacity devices. This is especially annoying for systems and devices in which a user expects immediate turn-on (i.e. cellular phones, PDAs, etc.). Simply storing the tables in the flash may work for read-only devices, such as flash devices storing only computer executable code, which is not changeable by the user. However, merely storing the tables in flash will not succeed when using devices used to store data which might be changing frequently (such as text files or spreadsheets in a PDA). This is so because when continuously writing to the device and changing its contents, the contents of the translation tables also change. It is not practical to update the copy of the tables in the flash each time they change in memory, because the incurred overhead will slow the system considerably. Consequently, a difference will be accumulated between the tables stored in flash and the "correct" ones in memory. Now if the user switches the power off and then turns it back on, without updating the tables, the software will read incorrect translation tables from flash, and the results might be data loss when writing new data.

According to some embodiments disclosed in Lasser, this problem may be solved by storing translation tables in the flash and adding some means for the software to invalidate the translation tables in a way that is detectable whenever reading them. Possible implementations (but not the only implementations) include adding a checksum value that makes the sum of all entries equal some fixed known value, or adding a validity flag to the stored tables. Additionally, one should ask the application software to call a specific function in the translation layer before shutting the system down.

In these ways the flash memory device is able to initiate fast wake-ups when the system undergoes an orderly shut down, and reverts to regular wake-ups when the system undergoes an un-orderly shut down.

While this solution is useful for many cases, there are situations where this solution may not be adequate. A first example where the solution may not be adequate is where sudden power failures are frequent and it is expected that many (or even most) of the power-up events will encounter invalid stored tables and will result in regular wake-ups that are slow.

A second example where the solution may not be adequate is where the operating system of the appliance hosting the flash memory system does not provide the software application with a service for orderly dismounting or shutting down. While complex operating systems like Linux do provide such service, there are many simpler and smaller operating systems that are designed for starting up the storage system upon power-on and never shut it down. In such cases the methods of Lasser will result in every power-up of the system doing a regular wake-up of the flash management system, gaining nothing from those methods.

A third example where the solution may not be adequate is where there is a strict limit on the length of the time interval between powering the system up and having it ready for operation. So even if power failures are rare and almost all power-up cases result in a fast wake-up of the flash management system, it is still unacceptable that a power failure will cause a later regular power-up sequence, regardless of how rare this occurs.

For the purpose of this disclosure, the term "block" is defined as the smallest unit of the flash memory that can be erased in a single operation. The term "page" is defined as the smallest unit of flash memory that can be written (also called "programmed") in a single operation. Typically, a block contains many pages.

For the purpose of this disclosure, the terms "flash management system" and "flash file system" are synonyms and may be used interchangeably. Each of these terms refers to a software module that manages the storage of data in a flash memory device, regardless whether the interface exported by the module is file-oriented (with commands like "open file" or "write file") or block-oriented (with commands like "read block" or "write block"), and regardless whether the software module runs on a controller dedicated solely for flash management or on the same host computer on which the applications using the storage system are running.

There is thus a widely recognized need for, and it would be highly advantageous to have, a method and system that can always guarantee a fast wake-up of the flash memory system, without compromising the integrity of the flash data structures.

SUMMARY

Some or all of the aforementioned needs, and other needs, may be satisfied by several aspects of the present invention.

The present inventor is now disclosing a technique whereby one or more flash management tables are updated and saved in non-volatile flash memory after some but not after all events of the flash memory system. When waking up, if it turns out that a given flash management table stored in the non-volatile flash contains out-of-date information, it is still possible to use the stored table(s) to facilitate system wake-up, and there is no requirement to invalidate the out-of-date table. Instead of invalidating this table, the out-of-date flash table flash memory table saved in flash memory before shut down and/or power loss may, when waking up, be used to re-construct the "proper" table (i.e. reflecting a current state of the system). In particular embodiments, this is carried out by concurrently maintaining in flash memory an events log, When waking up, data stored in the events log may be used to update the flash memory table and thereby maintain data integrity even if there was not an orderly exit before loss of power or shut-down. In particular embodiments, the deriving of an "up-to-date" from an "out-of-date" table stored in flash memory may be faster than the constructing of an up-to-date table by scanning the flash storage device.

It is now disclosed for the first time a method of maintaining flash data structures in accordance with events of a flash memory system. The method presently disclosed method includes (a) maintaining in flash memory at least one flash management table whose contents are indicative of a state of the flash memory system; (b) maintaining in the flash memory an events log, wherein, for at least one point in time, (i) a most recently stored the at least one flash management table is indicative of an earlier state of the flash memory system; and (ii) at least one event more recent than the at least earlier state is stored in the at least events log.

According to some embodiments, during the at least one point in time, a most recent event is stored in the events log.

According to some embodiments, during the at least one point in time a current state of the flash memory system is reflected by contents of the stored events log and the stored at least one flash management table. This feature may be useful for maintaining data integrity so that updated flash management tables may be later constructed, for example, when waking up.

According to some embodiments, the presently disclosed method further comprises (c) generating from the at least one table indicative of the earlier state and from the events log at least one table indicative of a more current state of the flash memory system According to some embodiments, the more current state is a most current state of the flash memory system at a time of the generating.

According to some embodiments, the generating is effected when waking up.

According to some embodiments, the maintaining of the at least one management table includes, at another point in time distinct from the at least one point in time, synchronizing the at least one flash management table to a latest recorded event of the events log.

According to some embodiments, the maintaining of the at least one flash management table in the flash memory includes periodically synchronizing in the flash memory the at least one flash management table to a current state.

According to some embodiments, the maintaining of the at least one flash management table in the flash memory includes, for every Nth change of state of the flash memory system, synchronizing in the flash memory the at least one flash management table to a current state, wherein N>=2.

According to some embodiments, the maintaining of the at least one flash management table in the flash memory includes: i) upon occurrence of a change of state of a first pre-determined type, synchronizing in the flash memory the at least one flash management table to a current state; and ii) upon occurrence of a change of state of a second pre-determined type, not synchronizing in the flash memory the at least one flash management table to the current state.

According to some embodiments, a frequency for which the at least one flash management table is updated in the flash memory is determined in accordance with an availability of resources of the flash memory system.

According to some embodiments, the at least one flash management table includes a translation table which maps virtual block numbers into physical block numbers.

According to some embodiments, the at least one flash management table includes a free blocks table.

According to some embodiments, the maintaining includes maintaining a plurality of the flash management tables in the flash memory.

According to some embodiments, the maintaining in the flash memory of an events log includes writing data to the flash memory using a faster writing mode of the flash memory.

According to some embodiments, the flash memory provides both MLC and SLC modes, and the maintaining in the flash memory of an events log is carried out using the SLC mode.

According to some embodiments, the maintaining of the log is carried out as part of caching operations of the flash memory system.

It is now disclosed for the first time a method of waking up in a flash memory system. The presently disclosed method includes I) When waking up, (a) reading from flash memory at least one flash management table describing a state of the flash memory system; (b) reading from the flash memory an events log containing records of pre-stored events of the flash memory system; (c) for at least one event stored in the events log, updating the at least one flash management table in accordance with changes effected by the at least one event.

According to some embodiments, the updating is repeated until the at least one flash management table is updated in accordance with a most recent event of the events log.

According to some embodiments, the at least one flash management table includes a translation table which maps virtual block numbers into physical block numbers.

According to some embodiments, the at least one flash management table includes a free blocks table.

According to some embodiments, a plurality of the flash management tables are read from the flash memory and updated.

It is now disclosed for the first time a flash memory system comprising (a) a flash memory for storing data; and (b) flash management software for maintaining data structures used for accessing the flash memory, wherein the flash management software is operative to: i) maintain in the flash memory at least one flash management table whose contents are indicative of a state of the flash memory system; and b) maintain in the flash memory an events log, such that, for at least one point in time, I) a most recently stored the at least one flash management table is indicative of an earlier state of the flash memory system; and II) at least one event more recent than the earlier state is stored in the events log.

It is now disclosed for the first time a flash memory system comprising (a) a flash memory for storing data; and (b) flash management software for maintaining at least one data structure used for accessing the flash memory, wherein, when waking up, the flash management software is operative to: (i) read from flash memory at least one flash management table describing a state of the flash memory system; (ii) read from the flash memory an events log containing records of pre-stored events of the flash memory system; (iii) for at least one event stored in the events log, update the at least one flash management table in accordance with changes effected by the at least one event.

It is now disclosed for the first time a computer readable storage medium having computer readable code embodied in the computer readable storage medium, the computer readable code comprising instructions for maintaining flash data structures in accordance with events of a flash memory system, wherein the instructions comprise instructions to: (a) maintain in flash memory at least one flash management table whose contents are indicative of a state of the flash memory system; (b) maintain in the flash memory an events log, wherein, for at least one point in time: (i) a most recently stored the at least one flash management table is indicative of an earlier state of the flash memory system; and (ii) at least one event more recent than the earlier state is stored in the events log.

It is now disclosed for the first time a computer readable storage medium having computer readable code embodied in the computer readable storage medium, the computer readable code comprising instructions for maintaining flash data structures in accordance with events of a flash memory system, wherein the instructions comprise instructions to: (I) When waking up, (a) read from flash memory at least one flash management table describing a state of the flash memory system; (b) read from the flash memory an events log containing records of pre-stored events of the flash memory system; (c) for at least one event stored in the events log, update the at least one flash management table in accordance with changes effected by the at least one event.

It is now disclosed for the first time a method of maintaining flash data structures in accordance with events of a flash memory system, the method comprising (a) maintaining in flash memory at least one flash management table whose contents are indicative of a state of the flash memory system; (b) maintaining in the flash memory an events log; and (c) concurrent with the maintaining of the at least one flash management table, maintaining in the flash memory data uniquely identifying a specific event of the events log.

In some embodiments, the specific event is a most recent event corresponding to the contents of the at least one table (for example, a most recent event that has influenced and/or modified the contents of the table).

It is now disclosed for the first time a method of maintaining flash data structures in accordance with events of a flash memory system. The method presently disclosed method includes (a) maintaining in flash memory at least one flash management table whose contents are indicative of a state of the flash memory system; (b) maintaining in the flash memory an events log; and c) concurrent with the maintaining of the events log, maintaining in the flash memory data uniquely identifying a specific event of the events log.

According to some embodiments, the maintaining of the uniquely identifying data includes maintaining in the flash memory an indication of a most recent event of the events log.

These and further embodiments will be apparent from the detailed description and examples that follow.

BRIEF DESCRITION OF THE DRAWINGS

FIG. 1 is a block diagram of an exemplary flash memory system in accordance with some embodiments of the present invention.

FIGS. 2A-2B provide an illustration of an exemplary translation table in accordance with some embodiments of the present invention.

Figure 3:
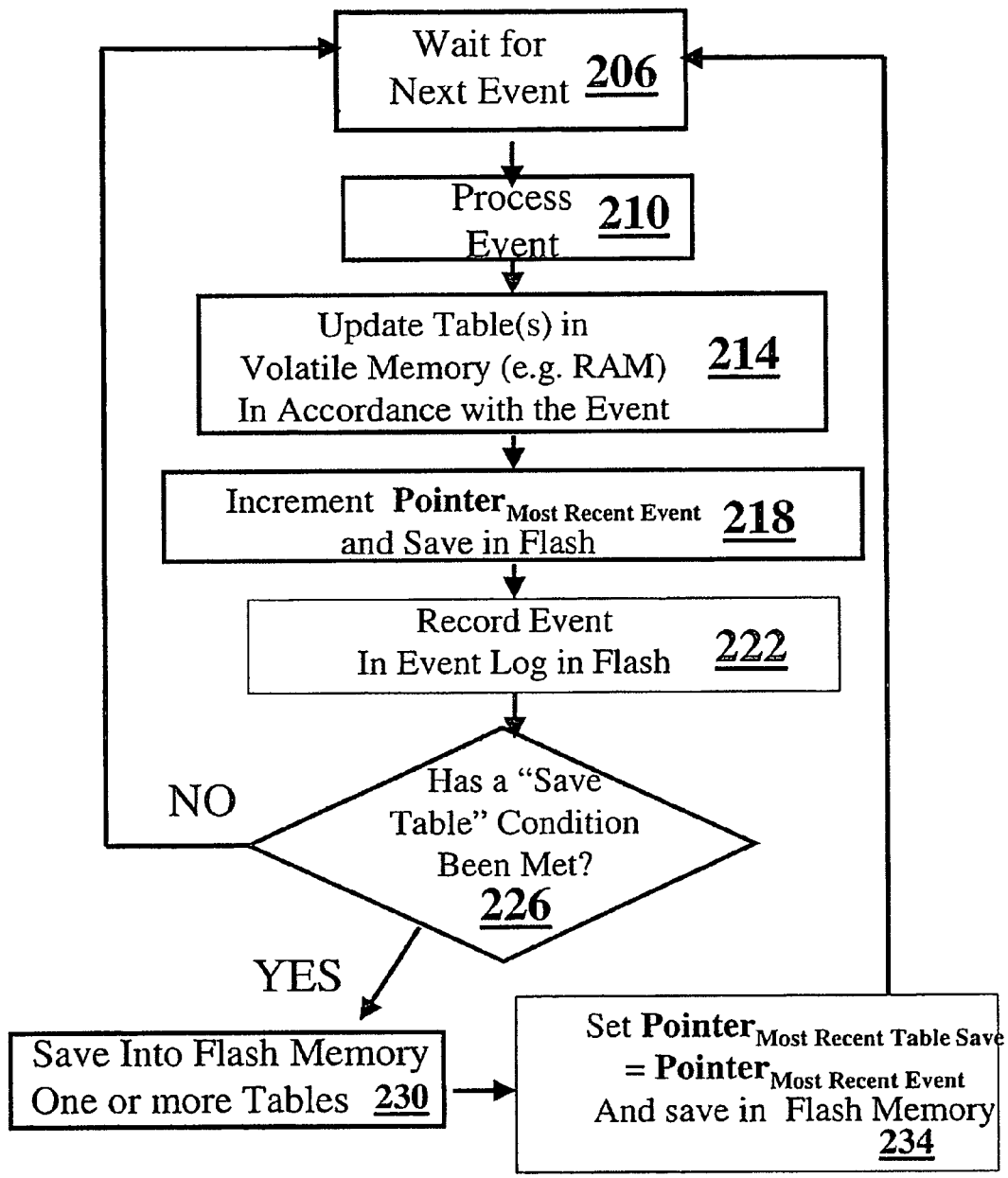
Figure 5:
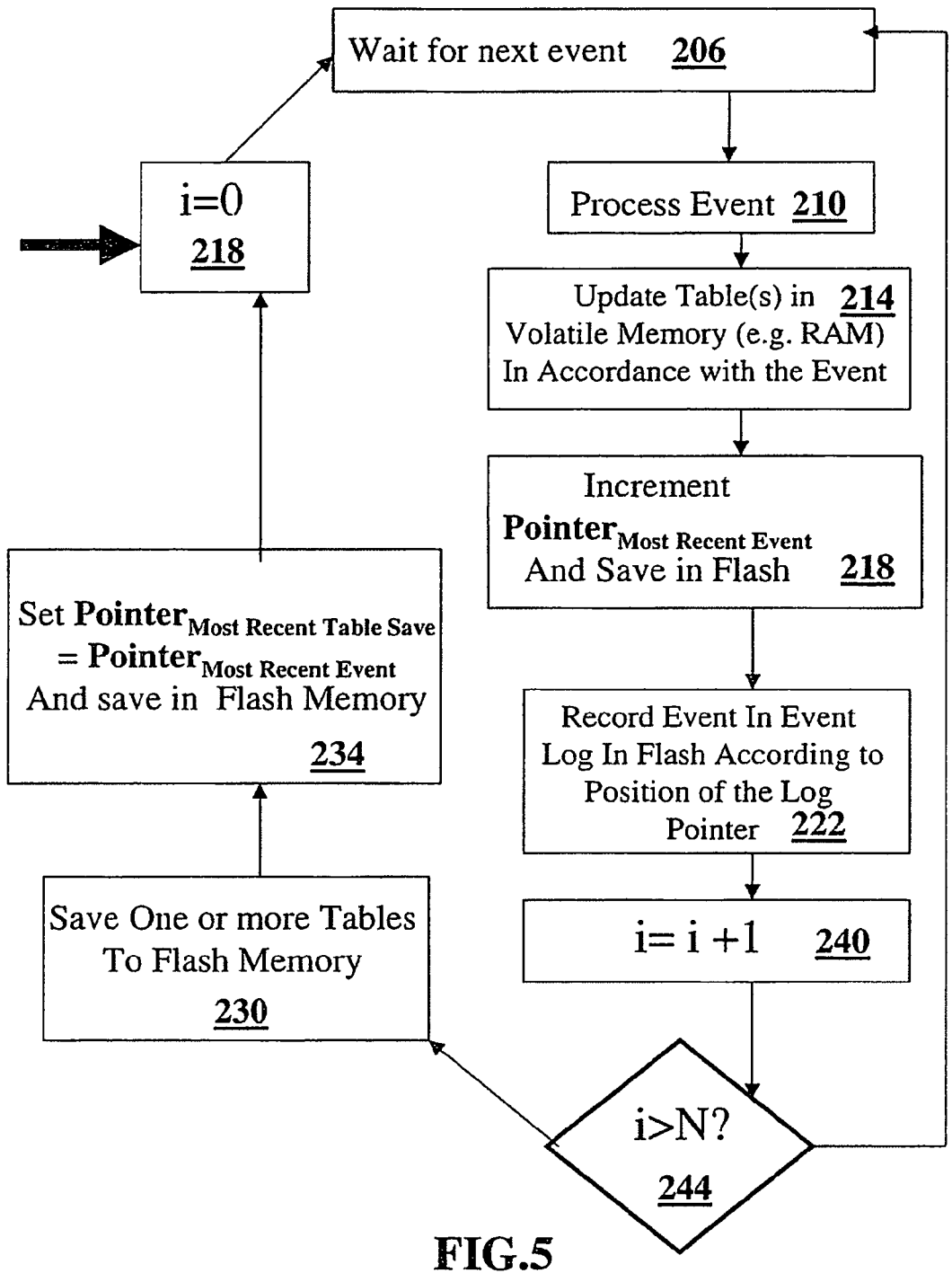
Figure 6:
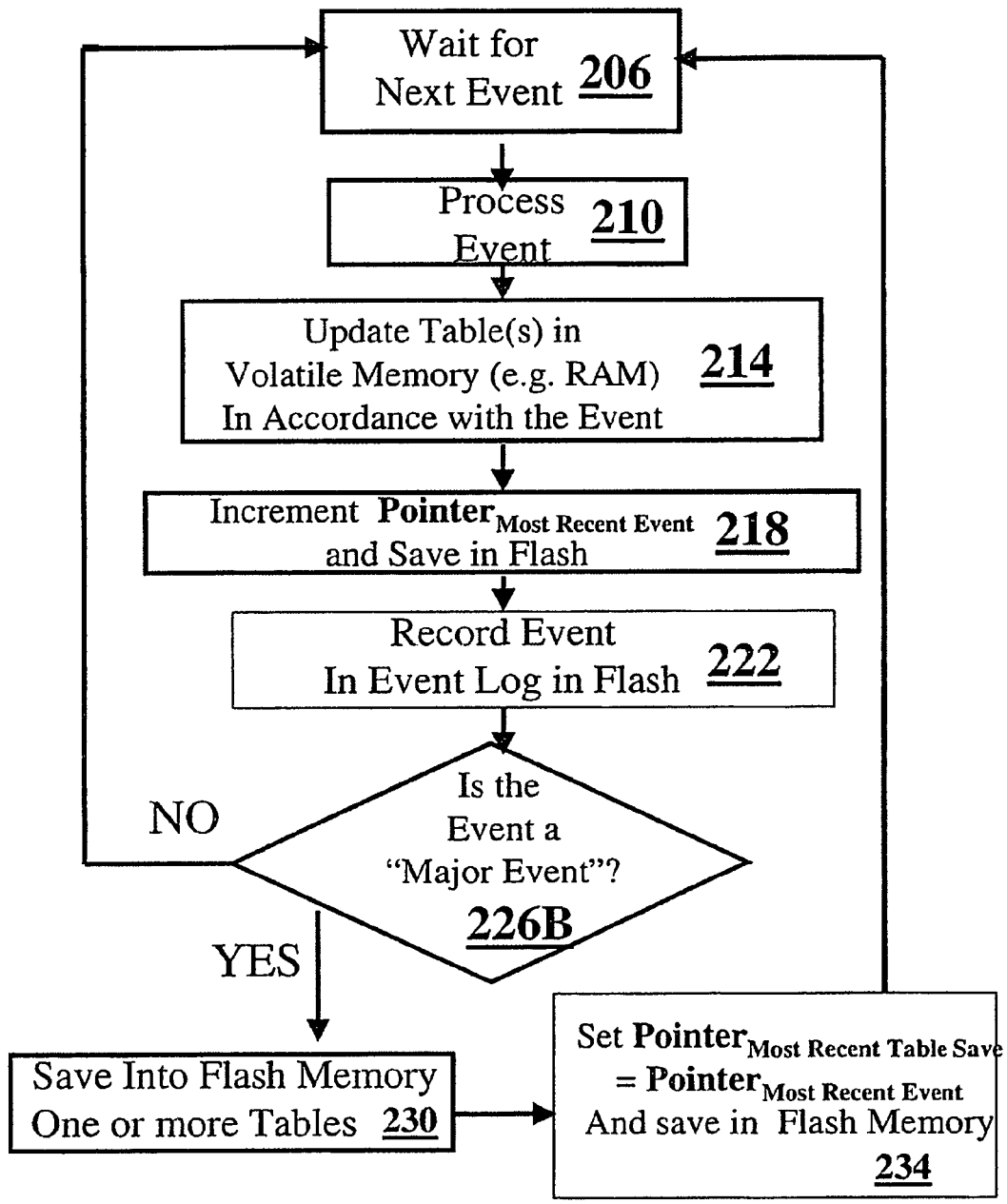

FIGS. 3, 5-6 provide flow-charts describing various routines for maintaining in flash memory one or more flash management tables and an events log in accordance with some embodiments of the present invention.

FIGS. 4, 8A-8C provide illustrations of an exemplary events log in accordance with some embodiments of the present invention.

Figure 7:
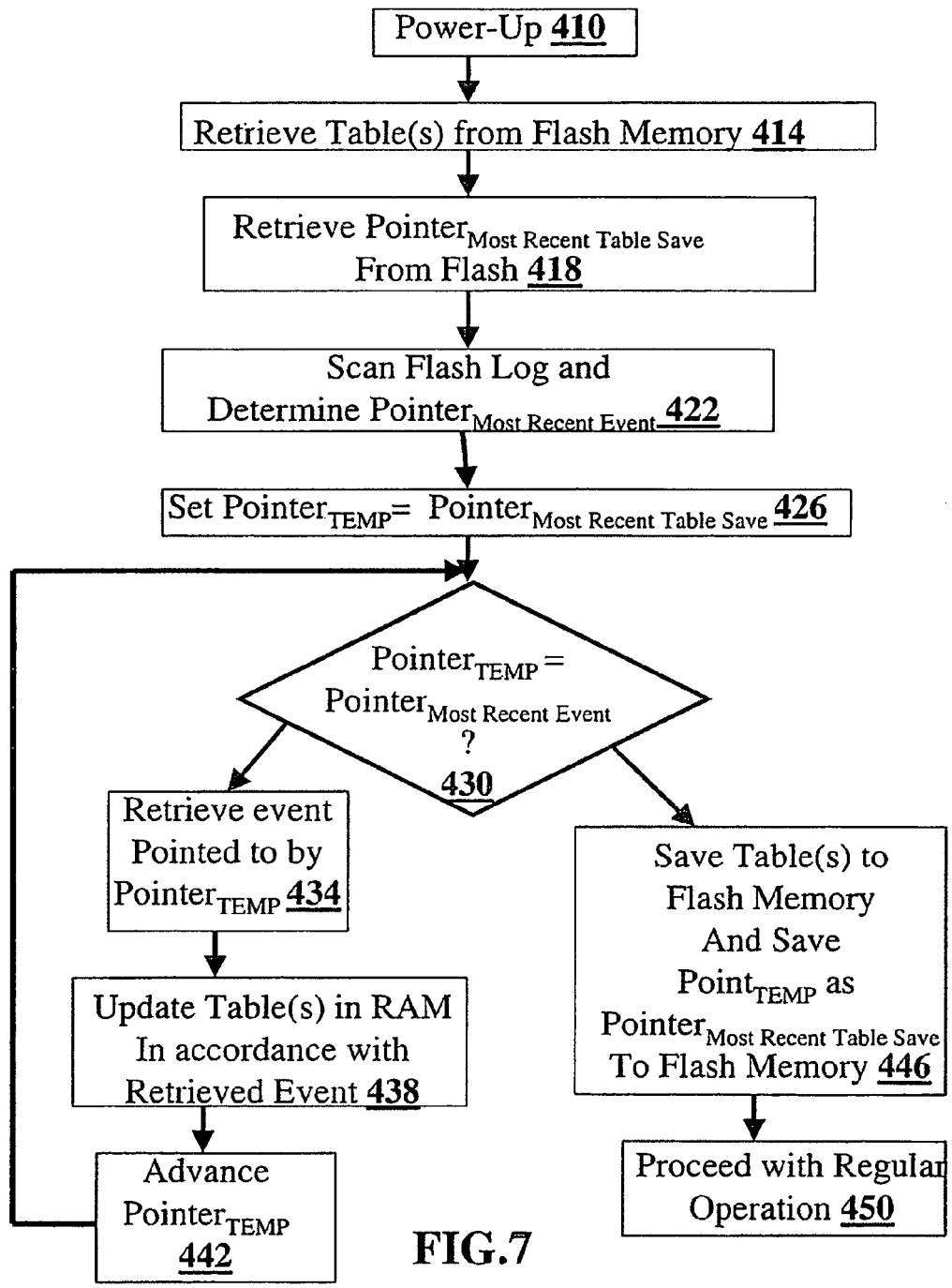

FIG. 7 provides a flow chart of an exemplary routine for waking up.

DETAILED DESCRIPTION

The present invention will now be described in terms of specific, example embodiments. It is to be understood that the invention is not limited to the example embodiments disclosed. It should also be understood that not every feature of the presently disclosed method, device and computer-readable code for maintaining data structures in accordance with events of a flash memory system is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

The presently disclosed methods, system and computer-readable code for maintaining data structures may be useful for facilitating a "fast-wakeup" of the flash memory system, for example, in environments where frequent power failures may be encountered. Nevertheless, this should not be construed as a limitation of the present invention, and is merely disclosed as one non-limiting application of the presently disclosed techniques for maintaining flash memory system data structures.

More specifically, presently disclosed techniques may be used to provide a fast wake-up of a flash management system, even under conditions in which unexpected power failures frequently occur, without sacrificing data integrity.

FIG. 1 is a block diagram of a non-limiting exemplary flash memory system 100 in accordance with some embodiments of the present invention. The exemplary system includes a memory module 120 for storing data, and a host device 110 (for example, a microcomputer, a smart card terminal, or any other device) which communicates with the memory module 120 via a host interface 180.

The memory module includes flash memory 130 of any type, as well as a controller 140 which accesses the flash memory in accordance with read and/or write and/or erase requests received through the host interface 180. For the example illustrated in FIG. 1, the controller includes a CPU 150, ROM 160 (where the code executed by the CPU is stored), and RAM 170 used by the CPU for supporting its code execution.

This block diagram of the non-limiting example FIG. 1 is representative of typical nonvolatile storage modules, such as SecureDigital flash memory cards or portable USB flash drives.

Flash Management Tables

It is noted that flash memory systems 100 typically store one or more flash management tables in volatile memory, for example, in RAM 170 of the memory module 120, in RAM of the host device 110, or in any other appropriate location. One non-limiting example of such a flash management table is a translation table which provides an address translation from a virtual block number to a physical block number, a mapping that exists in many flash managements systems, as for example in the system of U.S. Pat. No. 5,937,425. It is noted that the same concepts and methods are also applicable to any other type of a flash management table, for example a free blocks table that represents which blocks are free to use and which are not, a table that represents a mapping from a virtual block number into a group of one or more physical block numbers, etc.

For the purpose of this disclosure a "flash management table" is any table containing data used by the flash management system for supporting the operation of its algorithms, where the data in the table at any specific point in time represents some aspect of the state of the storage system at that specific time. For example, if the flash management table is a table containing a bit per each block of the flash memory, with the bit indicating whether the corresponding block is free to use or not, then the contents of the table at a first point of time are a first pattern of bits that represents the aspect of the state of the system regarding which of the blocks are free and which are not at that time. At a later point of time the pattern of bits in that table may be different than in the first point, implying a different mix of free and non-free blocks caused by some free blocks becoming non-free and some non-free blocks becoming free.

Over time, the data stored in the flash memory may change, and various ancillary data related to the flash memory may also change. The "state" of the flash memory system changes over time as different events (for example, write requests, housekeeping operations, etc) of the flash management system occur.

It is noted that each flash management table represents one or more aspects of a total "state" of the flash management system. Thus, any given flash management table or set of tables does not necessarily represent the full state of the system, just some aspect of it. In the example of a free blocks table mentioned above the knowledge of which blocks are free and which are not is certainly not enough for defining the complete state of the system. A non-free block may contain just a single used page, or it may be that all of its pages are written with valid data. This is not reflected by the free blocks table but by either other flash management tables or by some other means, but still that table does represent some aspect of the system state and therefore falls within the definition of a flash management table.

Thus, when particular flash memory table(s) representing a "current state" or an "earlier state" or a "later state" or a "most recent state" of the flash memory system are stored in volatile or non-volatile memory, this represents an "earlier" or "current" or "later" or "most recent" state of the aspect of the flash memory system represented by the particular flash memory table(s).

Over time, the flash management table moves between a sequence of states, each state representing, for a given time, one or more aspects of the flash memory system at the time. The aspect of the state of the system that is modeled by the table switches between discrete states with clear-cut transition points that correspond to events of the flash memory system.

An Exemplary Flash Management Table

FIG. 2A shows the contents of an exemplary flash management table that maps a virtual block number into a physical block number at a first point in time ($t=t_1$). The table is indexed by a virtual block number and produces the physical block number that currently contains the data of the corresponding virtual block. In practical implementations there may be no need to allocate space for storing the virtual block numbers as the table is ordered by those virtual block numbers and therefore can be directly indexed to the correct entry. However, for the convenience of presentation the table is shown as if both columns are physically represented.

The state of the virtual-to-physical mapping represented in FIG. 2A is such that if virtual block number 2 has to be accessed, then the table tells us the corresponding physical block is block number 172. At some point in time commands sent to the flash management system (or internal housekeeping operations taken by the system even without external commands, such as garbage collection operations) may cause the mapping to change. For example a command that writes new data into virtual block number 2 and thus over-writes its previous data may cause the flash management system to assign another physical block to correspond to virtual block number 2, and the new data is stored into that block.

FIG. 2B shows the contents of the virtual-to-physical flash management table after that change occurred at a later time ($t=t_2$). Now virtual block number 2 corresponds in the table to physical block number 777 and no longer to physical block 172. Thus, the table switched from a first state to a second state. Any change in the contents of a flash management table is defined as a state change of that table.

It should be emphasized that it is not the case that every write operation occurring in the flash management system causes a change of state in all its flash management tables. For example, if physical block 172 had some of its pages unused and a write operation is directed to virtual block number 2, such that according to the algorithms of the flash management system the new data is stored into those unused pages of physical block 172, then no change is made to the virtual-to-physical mapping and the table remains unchanged following that write operation. Thus the rate of a flash management table state changes is typically lower than the rate of operations carried out within the system. Also, if multiple flash management tables are maintained within the same flash management system (each representing a different aspect of the system's state), then each of the tables may change its state at different points in time.

Storing Data Structures (i.e. Table(s) and an Events Log) which are Useful when Waking Up As explained above, when initializing the system after a power-up, it may be necessary for the management software to create in RAM a fully updated copy of any flash management table it uses. In order to achieve a fast wake-up of the system, it is usually not acceptable to regenerate the contents of the tables only from data scattered throughout the blocks of the storage system, as this is too slow. The opposite alternative of saving a copy of a table into the non-volatile flash memory each time its state changes is also not acceptable because it adds a high overhead and reduces the system performance.

Techniques provided by various embodiments of the present invention provide a compromise between these two prior art approaches. Thus, a flash management table may be saved into the non-volatile flash memory only for some state changes, but not every time there is a state change.

This is illustrated in FIG. 3, which describes an exemplary routine for maintaining, in flash memory, data structures of the flash management system in accordance with some embodiments of the present invention. As used herein, 'maintaining in flash memory' includes storing in flash memory. Typically, maintaining in flash memory includes maintaining the table and/or relevant data for populating the table in volatile memory/RAM, and for a plurality of points in time, saving in flash memory an updated version of the table (i.e. synchronized to a current state of the flash memory system).

In accordance with the non-limiting embodiment of FIG. 3, it is noted that in non-limiting embodiments, for some points in time, the system may be idle, and the system may wait 206 for a next event. Upon processing 210 an event of the flash management system, one or more tables typically are updated 214 in volatile memory in accordance with the event that has occurred. These table(s) may or may not be updated in non-volatile flash after a given event.

Description of an Exemplary Events Log

The present inventor is now disclosing that in situations where the flash management table is saved after the occurrence of some but not all events, it may be useful to also maintain in flash memory a events log. In exemplary embodiments, this events log contains a plurality of records, where each record includes data describing a particular event of the flash management system Although not a limitation of the present invention, it is noted that typically this events log is updated in flash memory after each event. This may be useful for maintaining data integrity for situations where updated table(s) (i.e. updated in accordance with a latest event of the flash memory system) are not always saved in flash memory.

For embodiments where data integrity is provided (i.e. even if there is loss of power), typically, at any given moment of time, one of the following conditions is true: a) a table updated in accordance with a most recent event is stored in the non-volatile flash, b) a table updated in accordance with an earlier state (i.e. earlier than a most recent event, i.e. other events have transpired in the flash memory system since "earlier" event) is stored in flash memory, and the events log stored in flash memory includes records of all events that have transpired since the time of the "earlier event."

Figure 4:
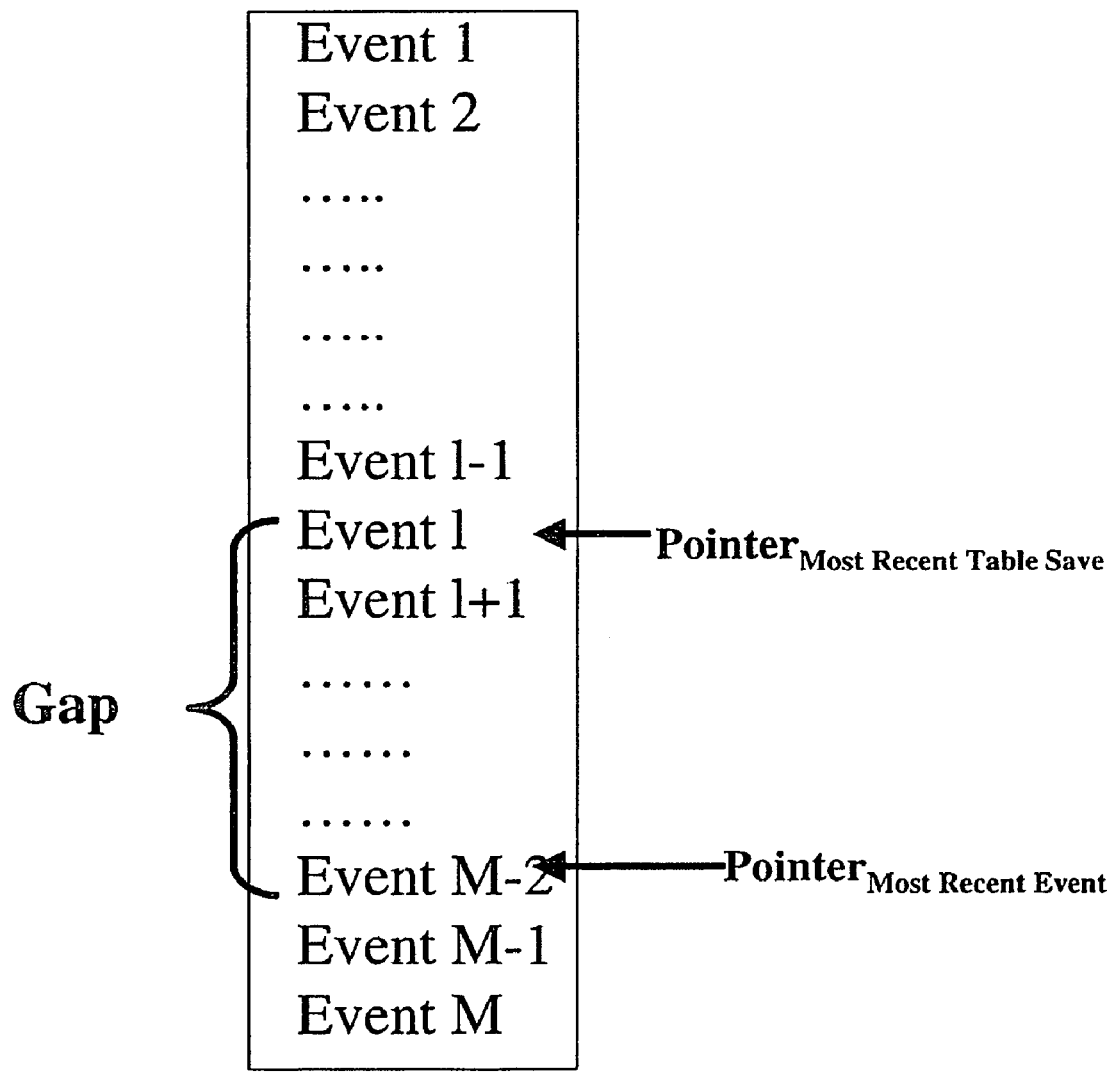

One exemplary implementation of the events log is a sequential queue in which every event that affects the state of the system (i.e. the state of the "at least one aspect of the system" stored in the one or more flash management tables) is registered, be it an external write command, an internal house-keeping operation, or any other event affecting the state. A non-limiting possible implementation of such a sequential events log, graphically illustrated in FIG. 4, is a cyclic queue that folds back to its lowest address after reaching its highest address. According to the example of FIG. 4, the size of the cyclical queue is "M" (up to M events may be stored).

According to the example of FIG. 4, two pointers are maintained, typically in flash. One pointer (in FIG. 4 pointing to event M-2) is denoted as $Pointer_{MOST\_RECENT\_EVENT}$. This pointer points to the last registered entry in the log. Whenever a new entry has to be added to the log, the pointer is first cyclically incremented to point to the next entry position (step 218 of FIG. 3) and then the new entry (step 222 of FIG. 3) is recorded in the point-to entry.

It is noted that repetitively recording 222 events of the flash memory system in the events log is defined as "maintaining the events log in flash memory."

Typically, the $Pointer_{MOST\_RECENT\_EVENT}$ is saved 218 in flash (either explicitly, or implicitly, by storing indicative data in the log such that the position of $Pointer_{MOST\_RECENT\_EVENT}$ may be determined). In one example there is no explicit $Pointer_{MOST\_RECENT\_EVENT}$ and the events log is structured so that one may identify its latest entry by scanning its contents, without requiring additional information. According to this example, this feature can easily be implemented by including a "generation" field within each entry, the generation being a number that increments on each successive entry. The latest entry in the log is then the entry with the highest generation field. Other implementations for achieving this feature (for example, storing an explicit $Pointer_{MOST\_RECENT\_EVENT}$) are also possible.

It is appreciated that the data indicative of $Pointer_{MOST\_RECENT\_EVENT}$ may be stored in any location in flash, and not necessarily in together with the events log in a single location in flash.

According to the non-limiting example of the "cyclical queue", if the space allocated to the log is large enough so that it does not ever fill up between two successive saving operations of any flash management table, then there is no need to monitor the contents of the queue and the new entries can safely over-write the oldest entries at the end of the queue.

The second pointer in FIG. 4, $Pointer_{MOST\_RECENT\_TABLE\_SAVE}$, will now be described. As shown in FIG. 3, the flash management table(s) are saved 230 into flash for some but not for all events of the flash memory system (i.e. only for events for which a "save table" condition has been met 226—this condition is discussed below). Thus, in some embodiments, whenever flash management table(s) are saved to non-volatile flash, an updated indication $Pointer_{MOST\_RECENT\_TABLE\_SAVE}$ of the most recent event is also 234 saved. At this time, the flash management tables saved in the non-volatile flash are said to be "synchronized to a latest state" or "latest event" of the flash memory system. At this time, the "gap" illustrated in FIG. 4 disappears.

When the log is subsequently updated without (for at least one event) saving updated table(s) in flash memory, the $Pointer_{MOST\_RECENT\_TABLE\_SAVE}$ starts to lag behind the most recent event (represented by Pointer$_{MOST\_RECENT\_EVENT}$), and the gap is re-created.

Referring to step 230, it is noted that when the table indicative of the current state of the flash memory system is saved in the non-volatile flash, this is defined as "synchronizing the table in flash memory to a current state."

Overall, the process where the flash management table(s) are stored in flash memory after various events (but not necessarily after all events) is defined as "maintaining the table in flash memory." At different points in time, another version of the flash management table(s) (typically, each subsequent version indicative of a later state of the flash memory system) is thus stored in flash memory. Thus, the "maintaining the table in flash memory" does not require that for any given moment the table most recently saved in the flash memory is synchronized with the current state of the flash memory system. Inspection of FIG. 3 indicates that there may be periods of time where the most recently stored flash memory table(s) are indicative of an earlier state of the flash memory system (i.e. a state of the system before more recent events occur in the flash memory system).

It is noted that the indication Pointer$_{MOST\_RECENT\_TABLE\_SAVE}$ may later be retrieved from the flash, for example, after power up of the flash system. By comparing Pointer$_{MOST\_RECENT\_EVENT}$ with Pointer$_{MOST\_RECENT\_TABLE\_SAVE}$, it may be determined at any given time whether or not the save flash management table(s) reflects the most recent state (i.e. the aspect of the state represented in the table) of the system.

While the above implementation of the events log is very simple and easy to implement, it is not the only possible one and other implementations are also possible.

It is noted that in some embodiments, the data recorded for each event of the events log includes at least all the data that is required to re-generate the effects of the event that caused it on the state of the system. There is no need to record the actual data related to the event in the events log, and in exemplary embodiments, the actual data is not recorded. For example if the event is a command from an external host system to write one page of data, the corresponding record in the log contains the virtual address of the sector to write, but not the data to write.

As noted above, in some embodiments, the Pointer$_{MOST\_RECENT\_EVENT}$ may be saved after every event, while data indicative of Pointer$_{MOST\_RECENT\_TABLE\_SAVE}$ is only saved after some events, when the table(s) is updated in flash.

Policies for Determining when to Save an Updated Flash Management Table(s) to Non-Volatile Flash Memory Any policy for determining what constitutes an event for which the updated table is saved into flash memory—i.e. the "save condition" of step 226 is within the scope of the present invention.

The present inventor is disclosing a number of policies in accordance with particular embodiments of the present invention.

In a first embodiment (illustrated in FIG. 5), the table is saved every Nth change of state of the table, where N is pre-determined. N can be as small as 2 when the saving overhead is low, or it can be as high as 100 or even more, for example, when the saving overhead is high. Thus, as illustrated in FIG. 5, a counter variable is initialized 218 to be zero. After each event, this counter variable is incremented 240. If the counter variable exceeds 244 the pre-determined value N, one or more tables are saved to flash memory 230, and the Pointer$_{MOST\_RECENT\_TABLE\_SAVE}$ is synchronized In flash memory with the most recent event of the event of the events log.

In a second embodiment (illustrated in FIG. 6), the "save table" condition (as it appears in step 226) is determined in accordance with the change of state triggered by a most recent event. For that purpose state changes are classified as either 'minor' changes or 'major' changes. Changes in the table state that are minor do not cause an immediate (i.e. before processing 210 the next event) saving of the table (i.e. the "NO" branch after step 226B), while changes that are major do cause an immediate saving. A non-limiting example for a classification of changes to minor and major is a free blocks flash management table where a change that changes a free block into a non-free block is considered minor, while a change that changes a non-free block into a free one is considered major. Other embodiments for policies of when to save a flash management table to non-volatile flash memory are also possible.

In a third embodiment the table(s) is saved periodically, whenever a pre-determined time interval expires. There is typically a tradeoff between how often the table is updated, and the amount of system resources expended in saving the flash management table(s) to non-volatile flash. On the other hand, saving the management table(s) more often means that, on average, a table retrieved from flash memory during wake-up is more likely to be more updated, thereby providing for a faster wake-up. It is noted that any time interval is within the scope of the present invention. In exemplary non-limiting embodiments, the time interval is between a tenth of a second and 5 or more minutes.

In a fourth embodiment, the frequency by which the table is updated is determined in accordance with an availability of system resources. In one example, when the controller 140 handles many read/write/erase requests, or during a period of time when there are many housekeeping operations, the flash management table(s) are saved to non-volatile flash less often, in order to conserve system resources. During periods of "low usage" when the system is otherwise idle or subjected to a low level of usage, it may be possible to save the flash management table(s) to non-volatile flash mole often without a significant impact upon flash system performance. Saving the flash management table(s) more often to flash may allow for a faster wake-up, especially in situations when was not an orderly exit (for example, an unexpected power loss).

As not every state change triggers a saving of the table, a gap or a mismatch is eventually created between the last saved copy of a table and its most updated copy in RAM. Whenever the table is saved, the gap is eliminated and the two copies (i.e. the copy in volatile RAM memory and the copy stored in non-volatile flash) become identical, but then again new changes of state that do not cause saving of the table create a gap again.

Waking-Up

In some embodiments, when an application makes an orderly exit, updated flash management table(s) (i.e. updated in accordance with most recent events of the flash memory system) are saved to flash memory. When waking up, these flash management table(s) are then retrieved from flash memory.

When there is no orderly exit, it is possible, when waking up, to retrieve the "out of date" flash management table(s) from flash memory into volatile memory, and then, in accordance with records stored in the events log, update, in volatile memory, the out of date flash management table.

Thus, embodiments provided by the present invention obviate the need to invalidate out of date tables as disclosed in Lasser U.S. Pat. No. 6,510,488.

FIG. 7 provides a flow chart describing an exemplary wake-up routine in accordance with some embodiments of the present invention. After powering up 410, the flash management system retrieves 414 the saved copy of a flash management table. Then the flash management system retrieves 418 $\text{Pointer}_{MOST\_RECENT\_TABLE\_SAVE}$ which points to the most recent event at a time that the flash management table(s) was saved to the non-volatile flash.

Next the flash management system determines 422 $\text{Pointer}_{MOST\_RECENT\_EVENT}$, for example, by scanning the events log and identifying its latest entry, or by retrieving an explicit value from non-volatile flash memory, or by any other technique $\text{Pointer}_{MOST\_RECENT\_EVENT}$ points to the latest logged event—the latest that transpired just before the system was shut down.

If the system was shut down immediately following the last saving of the flash management table and before an additional change of state of the table occurred (for example, if there was an "orderly exit," or in any other situation), then the two pointers (i.e. $\text{Pointer}_{MOST\_RECENT\_TABLE\_SAVE}$ and $\text{Pointer}_{MOST\_RECENT\_EVENT}$) should be identical. If, however one or more state changes of the flash management table(s) occurred after the last saving of the table and before system shut down, then a difference should be seen between the two pointers.

$\text{Pointer}_{MOST\_RECENT\_TABLE\_SAVE}$ points to the most recent event in the events log for which the saved table already reflects the effects on the table's state. All the events that appear in the log following that event, up to the last event in the log that is pointed to by $\text{Pointer}_{MOST\_RECENT\_EVENT}$, are not yet reflected in the saved table.

At this point, it is possible to "play back" the new events not yet reflected in the table. Towards this end, the entries from the events log (i.e. "pre-stored" events saved to the events log before the most recent power-up 410) may be read 434 one by one from oldest (i.e. pointed to by $\text{Pointer}_{MOST\_RECENT\_TABLE\_SAVE}$) to newest (i.e. pointed to by $\text{Pointer}_{MOST\_RECENT\_EVENT}$). For each such event, the flash management table(s)' state may be updated 438 (for example, in volatile memory) exactly in the same way as the original event affected that state. Towards this end, in some non-limiting implementations, it may be advantageous to define a "temporary" pointer $\text{Pointer}_{TEMP}$ which functions as an "iterator" variable, and points to a currently handled event of the events log. Initially, the value of $\text{Pointer}_{TEMP}$ is set 426 to $\text{Pointer}_{MOST\_RECENT\_TABLE\_SAVE}$ (as shown in FIG. 8A).

Figure 8A:
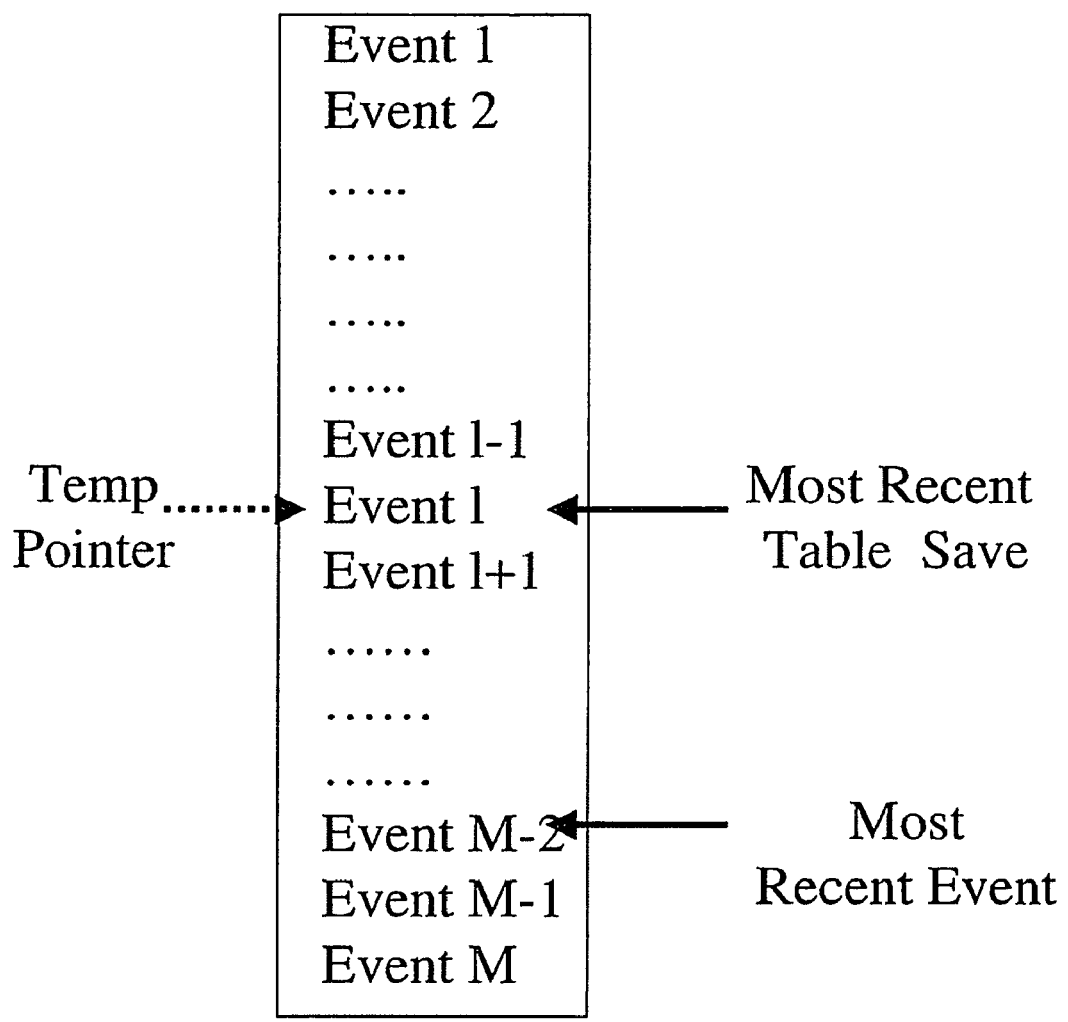
Figure 8B:
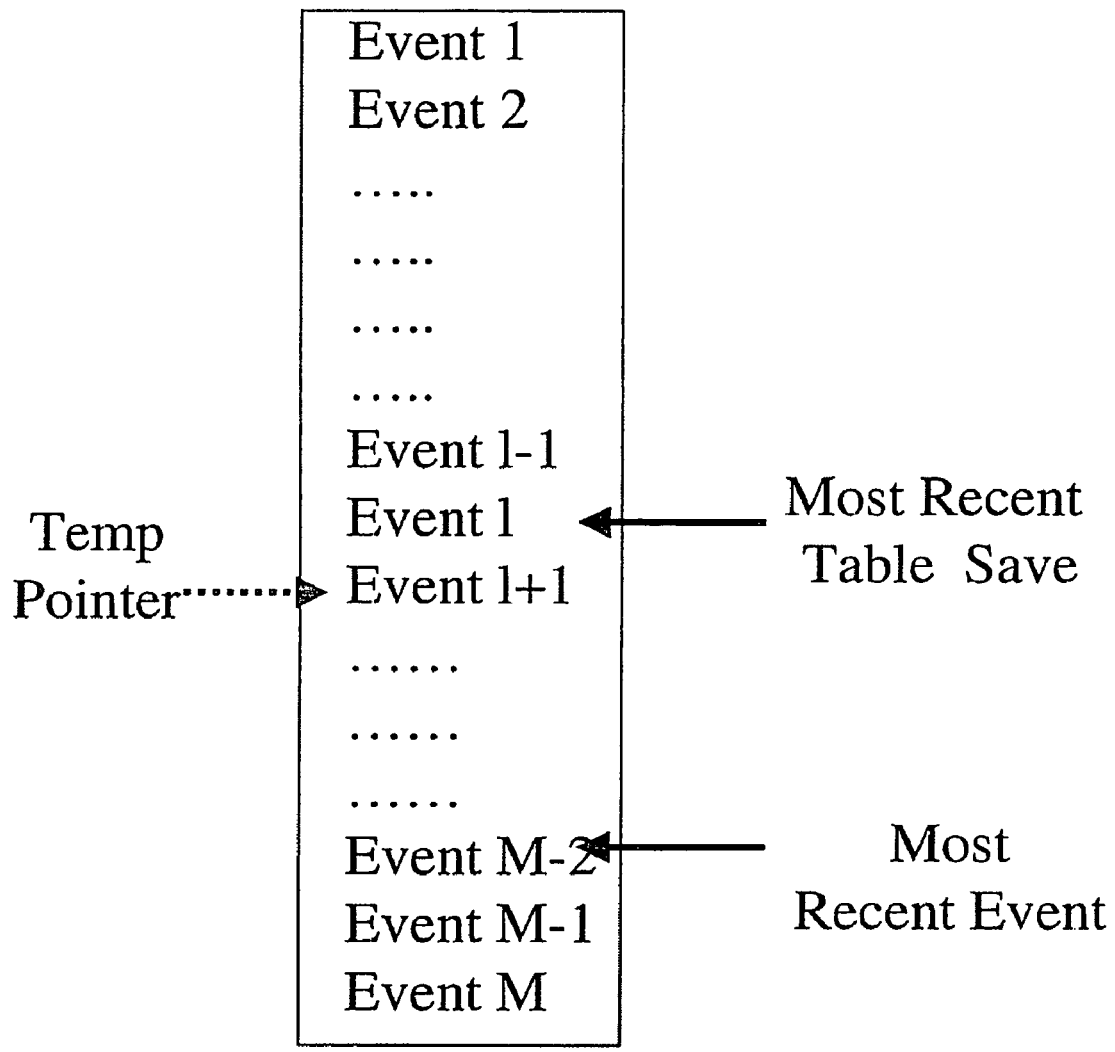
Figure 8C:
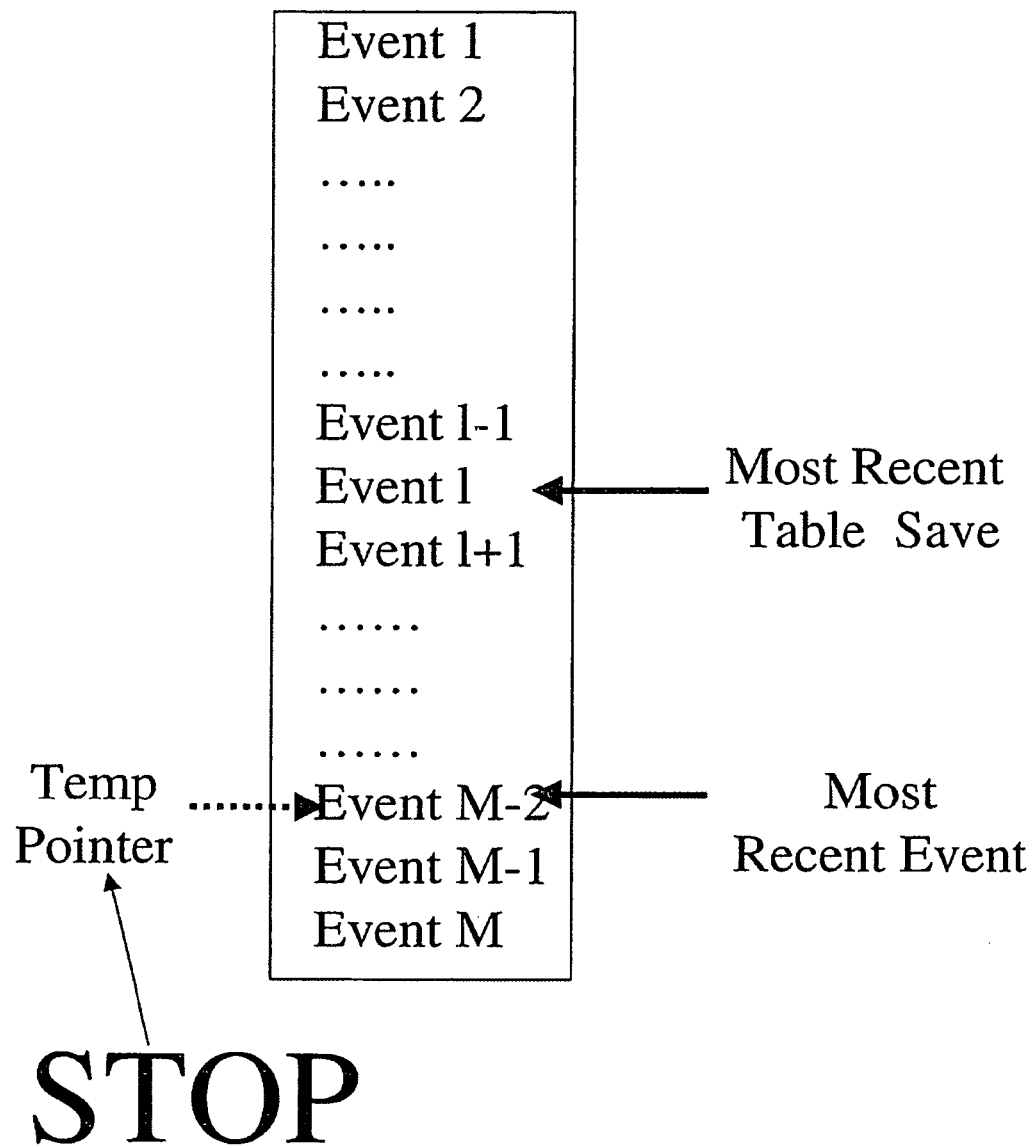

For each event (i.e. as illustrated in FIGS. 8A-8C) retrieved 434 from the log table, each flash management table (if there is more than one) is updated 438 to reflect the specific state changes applying to it. After handling each event (for example, pointed to by $\text{Pointer}_{TEMP}$) stored in the events log, the pointer (for example, $\text{Pointer}_{TEMP}$) may be advanced 442 to point to the next event of the event log. Once the latest log entry is processed (see FIG. 8C), the $\text{Pointer}_{TEMP}=\text{Pointer}_{MOST\_RECENT\_EVENT}$) equal and we are done. Determining if a given log entry is the "latest" log entry may, in some embodiments, be effected by comparing 430 the value of an "iterating" pointer (for example, $\text{Pointer}_{TEMP}$) with $\text{Pointer}_{MOST\_RECENT\_EVENT}$ At this point, when $\text{Pointer}_{TEMP}=\text{Pointer}_{MOST\_RECENT\_EVENT}$, the flash management table(s) are now fully updated and each reflects its most recent state as it had been before system shut down.

Optionally, one or more now updated flash management table(s) are saved 446 into the non-volatile flash memory (along with an updated $\text{Pointer}_{MOST\_RECENT\_TABLE\_SAVE}$), so that any future re-generation of the tables (if it will be required) will start from the current state.

After it is determined that the flash memory table(s) are updated in volatile memory and optionally in non-volatile memory, it is possible then to proceed 450 with regular operation of the flash memory system General Discussion about Performance One benefit provided by certain embodiments of the present invention is that the reading of the saved copy of the flash management table plus the playing back of the log entries not yet reflected in the saved copy of the table typically takes much shorter time than the re-creation of the table from scratch by scanning the many blocks of the storage system. If the system was shut down after saving the table before additional state changes occurred (for example if there is an orderly exit, or if we are "lucky" enough to shut down when $\text{Pointer}_{MOST\_RECENT\_EVENT}=\text{Pointer}_{MOST\_RECENT\_TABLE\_SAVE}$), then the wake-up time, in some embodiments, would be the fastest, the same as in the method of Lasser when an orderly shutdown took place. But even if some state changes took place after the last saving of the table, the wake-up time of the system may not be as bad as would occur with the method of Lasser when there was no orderly shutdown. In many situations, only a few entries of the log have to be read and their effects on the tables' state re-created. The exact time this takes typically depends on the number of entries that have to be played back. This in turn may depend on the rate with which the table is saved to non-volatile memory. The higher the rate the fewer entries that are to be played back on average and the faster the wake-up on average. On the other hand, the higher the saving rate the higher the time spent in saving overhead during regular operation of the system.

One other factor that may be relevant is the overhead spent for writing the events log entries. Typically, in embodiments where data integrity is provided, the log is written to on every event, which means it has to be written on every system state change that might affect a flash management table's state.

One might wonder whether the overhead costs of maintaining the events log are not higher than the overhead of saving the flash management table on each state change. Thus, in some embodiments, the flash management system may be designed to write events records to the events log writing in the fastest manner. Towards this end, it may be possible to employ a faster writing mode (for writing at least one of records to the events log and data indicative of the flash management table(s) into non-volatile flash memory) when the flash media provides more than one writing mode. An example is a flash system using flash memory devices providing both Multi-Level Cell (MLC) and Single-Level Cell (SLC) modes. Such device is disclosed by Chen in U.S. Pat. No. 6,456,528, which is incorporated as if fully set forth herein. While the "regular data" stored in the system (for example, data passed with a write request from the host device 110) is written using the slower MLC mode for achieving the highest storage density, the events log is written using the much faster SLC mode.

Maintaining a Log as Part of Caching Operations of the Flash Memory System

In some embodiments, one or more presently disclosed techniques may offer particular advantages in situations where the events log has to be maintained anyway regardless of considerations of flash management tables. This may be the case when the flash management system employs caching for the incoming data, where the incoming data is stored a first time in a first location in the flash memory upon its arrival, and at a later time is moved to a second location for long-term storage. As used herein, "caching" is the writing to the first location.

Thus, in such systems, the storing of the data in the first location (i.e. the caching) can be implemented in a way that will also provide the functionality of the events log. In such case there is then no extra overhead cost for implementing the log, and the benefit of the methods of the present invention are the highest.

While the above explanations were mainly focused on a single flash management table within the flash management system, the invention is equally applicable to multiple flash management tables, each representing a different aspect of the state of the system. If multiple tables exist, each can be saved using its own saving policy, not necessarily at the same points in time. On power-up, flash management table may be reconstructed using the methods presented above, with the same events log serving for all tables.

Additional Discussion about Presently Disclosed Systems

The presently disclosed techniques may be implemented using any combination of hardware, firmware and software.

In one non-limiting example, the saving of flash management tables and their recovery and reconstruction upon power up are all performed by controller 140, or more precisely—by CPU 150 executing code from ROM 160. This is however not the only system architecture possible for using the present invention. For example, it is also possible that the methods of the invention are implemented by code executed in host computer 110, as will be the case when the storage module is an on-board NAND flash device and there is no stand-alone controller. Another possibility is that the methods of the invention are at least partially implemented by host computer 110 and partially implemented by controller 140. All these architectures and many others are within the scope of the present invention.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise.

The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method of maintaining flash data structures in accordance with events of a flash memory system, the method comprising:
    a) maintaining in flash memory a first flash management table whose contents are indicative of a state of the flash memory system;
    b) maintaining in volatile memory a second flash management table whose contents are indicative of a state of the of the flash memory system; and
    c) maintaining in said flash memory an events log,
        i) wherein the method is carried out such that for at least one point in time, the first flash management table that is stored in said flash memory represents an earlier state of the flash memory system; and
        ii) wherein said earlier state of the flash memory system is
            A) earlier than a most recent event, the most recent event being stored in the events log in said flash memory and reflected in the second flash management table in the volatile memory; and
            B) later than a most recent power up of the flash memory system.

2. The method of claim 1 wherein for said at least one point in time a current state of the flash memory system is reflected by contents of said events log stored in said flash memory and said first flash management table stored in said flash memory.

3. The method of claim 1 wherein said maintaining of said first management table includes, at another point in time distinct from said at least one point in time, synchronizing said first flash management table to a latest recorded event of said events log.

4. The method of claim 1 wherein said maintaining of said first flash management table in said flash memory includes periodically synchronizing in said flash memory said first flash management table to a current state.

5. The method of claim 1 wherein said maintaining of said first flash management table in said flash memory includes, for every Nth change of state of the flash memory system, synchronizing in said flash memory said first flash management table to a current state, wherein N>=2.

6. The method of claim 1 wherein said maintaining of said first flash management table in said flash memory includes:
    i) upon occurrence of a change of state of the flash memory system_of a first pre- determined type, synchronizing in said flash memory said first flash management table to a current state; and
    ii) upon occurrence of a change of state of the flash memory system of a second pre- determined type, not synchronizing in said flash memory said first flash management table to said current state.

7. The method of claim 6 wherein said maintaining of said events log includes, upon a given said occurrence of a change of state of said first pre-determined type, recording to said events log in said flash memory, a plurality of events of the flash memory system that occur:
    i) after said given occurrence of said change of state of said first pre-determined type; and
    ii) before a first power-down of the flash memory system that occurs after the change of state of the first pre-determined type.

8. The method of claim 7 wherein said recording of said plurality of events to said events log in said flash memory is carried out before said first power-down of the flash memory system that occurs after the change of state of the first pre-determined type.

9. The method of claim 1 wherein a frequency for which said first flash management table is updated in said flash memory is determined in accordance with an availability of resources of the flash memory system.

10. The method of claim 1 wherein first flash management table includes at least one of (i) a translation table which maps virtual block numbers into physical block numbers and (ii) a free blocks table.

11. The method of claim 1 where the method is carried out such that said earlier state of the flash memory system is earlier than a second most recent said event stored in said events log in said flash memory.

12. The method of claim 1 wherein said events log maintaining in said flash memory is carried out such that each event is recorded in flash memory before an occurrence of a respective next event of the flash memory system.

13. The method of claim 1 further comprising:
d) generating at least one table indicative of a state of the flash memory system that is more current than said earlier state from:
i) said event log stored in said flash memory, and
ii) said first flash management table that is:
A) stored in said flash memory; and
B) no more current than said earlier state.

14. The method of claim 13 wherein said more current state is a most current state of the flash memory system at a time of said generating.

15. The method of claim 13 wherein said generating is effected when waking up.

16. The method of claim 1 wherein the method is carried out such that at least one of said at least one point in time is subsequent to a handling of a most recent event by the flash management system.

17. The method of claim 16 wherein said earlier state of the flash memory system is:
C) earlier than each event of a plurality of different events stored in said events log in said flash memory.

18. The method of claim 1 wherein the maintaining of said first flash management table in said flash memory further includes:
i) at a time when a plurality of events of the flash memory system have occurred since a most recent update of said first management table in said flash memory, deciding, in accordance with a cardinality of said plurality, whether or not to synchronize, in said flash memory, said first flash management table to a current state of the flash management system; and
ii) contingent on said deciding, synchronizing, in said flash memory, said first management table to said current state of the flash management system.

19. The method of claim 1 wherein the maintaining of said first flash management table in said flash memory further includes:
i) at a time when a plurality of events of the flash memory system have occurred since a most recent update of said first flash management table in said flash memory, deciding, in accordance with an amount of time that has elapsed since said most recent update of said first management table in said flash memory, whether or not to synchronize, in said flash memory, said first flash management table to current state of the flash management system; and
ii) contingent on said deciding, synchronizing, in said flash memory, said at least one flash management table to said current state of the flash management system.

20. The method of claim 1 wherein the maintaining of said first flash management table in said flash memory further includes:
i) determining whether or not an event of the flash memory system changes a non-free block into a free block;
ii) in accordance with results of said determining, deciding whether or not to synchronize, in said flash memory, said first flash management table to a current state of the flash management system; and
iii) contingent on said deciding, synchronizing, in said flash memory, said first flash management table to said current state of the flash management system.

21. The method of claim 20 wherein the determining is a determining of whether or not a most recent event of the flash memory system changes a non-free block into a free block.

22. The method of claim 20 wherein the determining and the deciding are carried out at a time when a plurality of events of the flash memory system have occurred since a most recent update of said first flash management table in said flash memory.

23. A method of waking up in a flash memory system, the method comprising:
I) When waking up,
a) reading from flash memory at least one flash management table describing a state of the flash memory system;
b) reading from said flash memory an events log containing records of pre-stored events of the flash memory system;
c) for at least one event stored in said events log, updating said at least one flash management table in accordance with changes effected by said at least one event.

24. The method of claim 23 wherein:
i) said reading of said events log includes reading from said flash memory a record of a most recent event of the flash management system; and
ii) said updating includes updating said at least one flash management table in accordance with a most recent event of said events log.

25. The method of claim 23 wherein said at least one flash management table includes a translation table which maps virtual block numbers into physical block numbers.

26. The method of claim 23 wherein:
i) said reading from said flash memory of said events log includes reading records of every event that occurred more recently than a most current said flash management table, said every event including a plurality of distinct events;
ii) said updating includes updating said most current flash management table in accordance with a respective change effected each event of said every more recent event.

27. The method of claim 23 wherein:
i) said reading from said flash memory of said at least one flash management table includes reading at least one obsolete table that describes a state of the flash memory system that is earlier than as a most recent event of said flash-read events log; and
ii) said updating includes updating said at least one obsolete table in accordance with at least one said more recent event of said flash-read events log.

28. The method of claim 23 wherein said updating includes, for each event of a plurality of events stored in said events log, updating said at least one flash management table in accordance with a respective change effected by said each event of said plurality of events.

29. A flash memory system comprising:
a) a flash memory for storing data;
a.1) a central processing unit (CPU); and
b) flash management software for maintaining at least one data structure used for accessing said flash memory,
wherein, when waking up, said flash management software is configured to, as a result of execution on said CPU, cause said CPU to:
i) read from flash memory at least one flash management table describing a state of the flash memory system;
ii) read from said flash memory an events log containing records of pre-stored events of the flash memory system;
iii) for at least one event stored in said events log, update said at least one flash management table in accordance with changes effected by said at least one event.

30. The system of claim 29 wherein said execution of said flash management software is operative such that:
i) said reading of said events log includes reading from said flash memory a record of a most recent event of the flash management system; and
ii) said updating includes updating said at least one flash management table in accordance with a most recent event of said events log.

31. The system of claim 29 wherein said execution of said flash management software is operative such that:
   i) said reading from said flash memory of said at least one flash management table includes reading at least one obsolete table that describes a state of the flash memory system that is earlier than as a most recent event of said flash-read events log; and
   ii) said updating includes updating said at least one obsolete table in accordance with at least one said more recent event of said flash-read events log.

32. The system of claim 29 wherein said execution of said flash management software is operative such that:
   i) said reading from said flash memory of said at least one flash management table includes reading at least one obsolete table that describes a state of the flash memory system that is earlier than as a most recent event of said flash-read events log;
   ii) said updating includes updating said at least one obsolete table in accordance with at least one said more recent event of said flash-read events.

33. A non-transitory computer readable storage medium having computer readable code embodied in said computer readable storage medium, said computer readable code comprising instructions for waking up in a flash memory system, wherein said instructions comprise instructions to:
   I) When waking up,
      a) read from flash memory at least one flash management table describing a state of the flash memory system;
      b) read from said flash memory an events log containing records of pre-stored events of the flash memory system;
      c) for at least one event stored in said events log, update said at least one flash management table in accordance with changes effected by said at least one event.

34. A flash memory system comprising:
   a) a flash memory for storing data;
   b) a volatile memory for storing data;
   c) a central processing unit (CPU); and
   d) a flash management software for maintaining data structures used for accessing said flash memory,
      i) wherein said flash management software is configured to, as a result of execution on said CPU, cause said CPU to:
         A) maintain in said flash memory a first flash management table whose contents are indicative of a state of the flash memory system;
         B) maintain in said flash memory an events log; and
         C) maintain in said volatile memory a second flash management table;
      ii) wherein said execution of said flash management software is further operative such that, for at least one point in time, said first flash management table that is stored in said flash memory represents an earlier state of the flash memory system; and
      iii) wherein said earlier state of the flash memory system is
         A) earlier than a most recent said event stored in said events log in said flash memory;
         B) earlier than a most recent even represented in the second flash management table stored in the volatile memory; and
         C) later than a most recent power up of the flash memory system.

35. The system of claim 34 wherein said execution of said flash management software is operative such that said earlier state of the flash memory system is earlier than a second most recent said event stored in said events log in said flash memory.

36. The system of claim 34 wherein said execution of said flash management software is operative such that said events log maintaining in said flash memory is carried out such that each event is recorded in flash memory before an occurrence of a respective next event of the flash memory system.

37. A non-transitory computer readable storage medium having computer readable code embodied in said computer readable storage medium, said computer readable code comprising instructions for maintaining flash data structures in accordance with events of a flash memory system, wherein said instructions comprise instructions to:
   a) maintain in flash memory a first flash management table whose contents are indicative of a state of the flash memory system;
   b) maintain in volatile memory a second flash management table whose contents are indicative of a state of the of the flash memory system; and
   c) maintain in said flash memory an events log,
      i) wherein for at least one point in time, the first flash management table that is stored in said flash memory represents an earlier state of the flash memory system; and
      ii) wherein said earlier state of the flash memory system is
         A) earlier than a most recent event, the most recent event being stored in the events log in said flash memory and in the second flash management table in the volatile memory; and
         B) later than a most recent power up of the flash memory system.
      ii) wherein said earlier state of the flash memory system is earlier than a most recent event stored in said events log in said flash memory and reflected in said second flash management table.

38. A method of maintaining flash data structures in accordance with events of a flash memory system, the method comprising:
   a) maintaining in flash memory a first flash management table whose contents are indicative of a state of the flash memory system;
   b) maintaining in volatile memory a second flash management table whose contents are indicative of a state of the of the flash memory system; and
   c) maintaining in said flash memory an events log such that each event is recorded in flash memory before an occurrence of a respective next event of the flash memory system
      i) wherein the method is carried out such that for at least one point in time, said first flash management table that is stored in said flash memory represents an earlier state of the flash memory system; and
      ii) wherein said earlier state of the flash memory system is earlier than a most recent event stored in said events log in said flash memory and reflected in said second flash management table.

39. The method of claim 38 wherein the method is carried out such that at least one of said at least one point in time is subsequent to a handling of a most recent event by the flash management system.

40. A flash memory system comprising:
   a) a flash memory for storing data;
   b) a volatile memory used for storing data related to the control and use of the flash memory;
   c) a central processing unit (CPU); and
   d) flash management software for maintaining data structures used for accessing said flash memory,
      i) wherein said flash memory management software is configured to, as a result of execution on said CPU, cause said CPU to:

A) maintain in said flash memory a first flash management table whose contents are indicative of a state of the flash memory system;
B) maintain in said volatile memory a second flash management table whose contents are indicative of a state of the flash memory system; and
C) maintain in said flash memory an events log such that each event is recorded in flash memory before an occurrence of a respective next of the flash memory system and
ii) wherein said execution of said flash management software is further operative such that, for at least one point in time, said first flash management table represents an earlier state of the flash memory system; and
iii) wherein said earlier state of the flash memory system is earlier than a most recent said event stored in said events log in said flash memory and reflected in the second flash management table in the volatile memory.

41. A non-transitory computer readable storage medium having computer readable code embodied in said computer readable storage medium, said computer readable code comprising instructions for maintaining flash data structures in accordance with events of a flash memory system, wherein said instructions comprise instructions to:
a) maintain in flash memory a first flash management table whose contents are indicative of a state of the flash memory system;
b) maintain in volatile memory a second flash management table whose contents are indicative of a state of the flash memory system; and
c) maintain in said flash memory an events log such that each event is recorded in flash memory before an occurrence of a respective next event of the flash memory system
i) wherein for at least one point in time, said first flash management table that is stored in said flash memory represents an earlier state of the flash memory system; and
ii) wherein said earlier state of the flash memory system earlier than a most recent said event stored in said events log in said flash memory and reflected in the second flash management table in volatile memory.

* * * * *